Patented Aug. 11, 1936

2,050,708

UNITED STATES PATENT OFFICE 2,050,708

METHOD FOR THE PRODUCTION OF SULPHUR BY MEANS OF REDUCTION OF SULPHUR DIOXIDE

Axel Rudolf Lindblad, Djursholm, Sweden

No Drawing. Application June 13, 1934, Serial No. 730,536. In Sweden February 22, 1934

4 Claims. (Cl. 23—226)

The present invention relates to a method for the production of sulphur from gases containing sulphur dioxide, obtained in roasting or other treatment of sulphur pyrites, copper pyrites, arsenical pyrites or other sulphurous ores by means of reduction of the sulphur dioxide with carbon monoxide in the presence of a catalyst, and the invention is characterized chiefly thereby that as a catalytically active substance be used so-called aluminate cement ("smelt cement") containing at least 25% $Al_2O_3$ alone or in mixture with other substances.

It has been suggested in the production of sulphur by means of reduction of $SO_2$ to make use of ordinary cement as catalyst. Experiments carried out have, however, shown that at least in those cases where the carbon monoxide constitutes the reducing agent, a far better effect is obtained by the use of these kinds of cement rich in alumina, which pass under the name of aluminate cement or melted cement, and which are obtained by smelting together bauxite or other substances rich in alumina with lime or limy substances. This aluminate cement is melted instead of only sintered like ordinary cement, and is comparatively rich in calcium aluminate and poor in calcium silicate. As the catalytical effect depends upon the alumina content, this should be high, at least 25% $Al_2O_3$, preferably at least 35%.

The contact mass can most simply and easily be manufactured in such a way that the cement mixture is moulded into pieces of the desired size or also cast into larger cement blocks, which are then crushed.

With this catalysator a good effect is obtained at a temperature of as low as 350° C., even somewhat below this. The best range of temperature is between 400 and 650° C. If the temperature is too high, the composition of the cement is changed, and the catalytical effect weakened.

A further improvement in the catalytical effect can be obtained by mixing into the cement iron or manganese compounds, preferably oxides or hydroxides, and a particularly good effect has been obtained by an admixture of lake or bog ore, possibly such as is rich in manganese.

Having thus described my invention I declare that what I claim is:—

1. In the production of sulphur from gases containing $SO_2$ obtained in roasting or other treatment of sulphur pyrites, copper pyrites, arsenical pyrites or other sulphurous ores by means of reduction of the sulphur dioxide with carbon monoxide in the presence of a catalyst, the improvement including employing as a catalyst, a cast cement relatively high in aluminiferous-content and amounting to at least 25% of the total, and relatively low in silica-content.

2. Method according to claim 1, characterized thereby that as a catalytically active substance there is used with the high-alumina content cement, a compound containing iron.

3. Method according to claim 1, characterized thereby that as a catalytically active substance there is used with the high-alumina content cement, a manganese containing compound.

4. Method according to claim 1, characterized thereby that the reduction process be carried out at a temperature of from 350 to 650° C.

AXEL RUDOLF LINDBLAD.